UNITED STATES PATENT OFFICE.

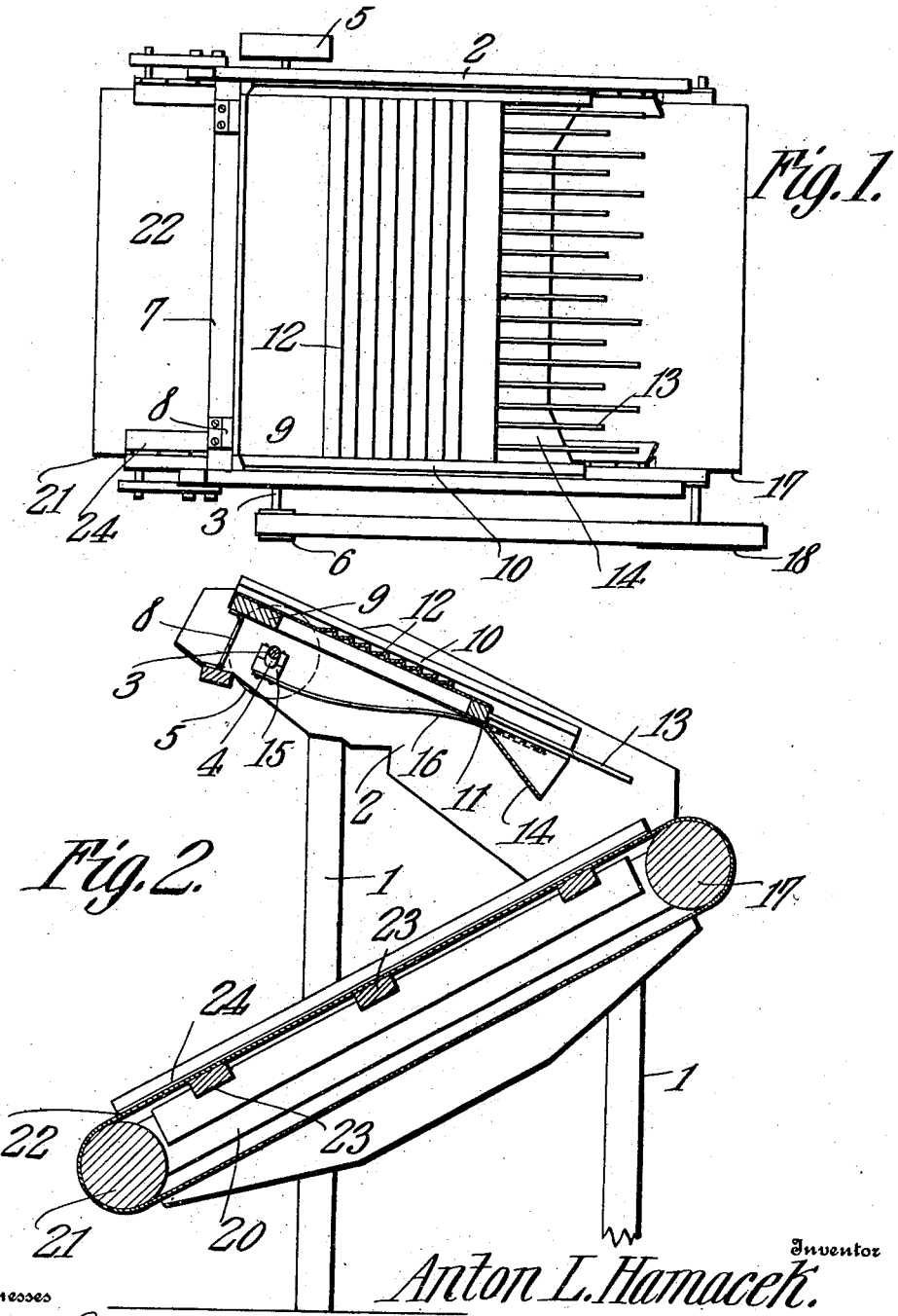

ANTON L. HAMACEK, OF KEWAUNEE, WISCONSIN.

PEA-SEPARATOR.

No. 909,587.    Specification of Letters Patent.    Patented Jan. 12, 1909.

Application filed September 8, 1908. Serial No. 452,008.

*To all whom it may concern:*

Be it known that I, ANTON L. HAMACEK, a citizen of the United States, residing at Kewaunee, in the county of Kewaunee and State of Wisconsin, have invented a new and useful Pea-Separator, of which the following is a specification.

This invention has relation to pea separators, and it consists of the novel construction and arrangement of its parts, as hereinafter described.

The object of the invention is to provide a simple and effective means for separating peas from the vines after the vines have been passed through a threshing machine.

In the processes now generally employed for threshing peas from the vines, much of the grain which is threshed remains entangled or enmeshed in the vines, and is passed out of the thresher with the vines, and, consequently, is unrecovered and lost.

The present invention is designed to be used for treating the vines as they come from a thresher for the purpose of recovering or saving that grain which is carried with the vines, as above indicated. The saving thus made of the grain which is otherwise lost, amounts to about ten per cent. of the entire amount of grain carried by the vines, and, consequently, the importance of saving the grain, otherwise lost, amounts to quite an item in comparison with the grain secured by threshing in the first instance.

With the above object, the present invention consists of an agitator upon which the vines containing the unrecovered grain are passed from the thresher or otherwise. The said agitator is of peculiar construction and is pitched at such an angle as to advance the material, and, at the same time, effect a separation of the grain from the enmeshing vines. At the lower end of the agitator the grain is permitted to fall upon an endless belt, the upper run of which is moving in the opposite direction in that to which the belt is pitched, and, consequently, the grain, by reason of its round configuration, may roll down the upper run of the belt against the movement of the belt, while the vines, leaves and trash, are carried by the upper run of the belt and cast from the machine at the opposite side thereof to that from which the grain is delivered.

In the accompanying drawings:—Figure 1 is a top plan view of the pea-separator, and Fig. 2 is a longitudinal sectional view of the same.

The pea-separator consists of the standards 1, 1, on the upper ends of which is mounted the frame 2. The shaft 3 is journaled for rotation at the upper end of the frame 2, and is provided, at points between the sides of the frame 2, with the cranks 4. The belt-pulley 5 is located upon one end of the shaft 3, and the belt-pulley 6 is located upon the opposite end thereof.

The cross-bar 7 connects the sides of the frame 2 together and is located at the upper end portion of the said frame. The standards 8 are hingedly connected at their lower ends with the said cross-bar 7, and are hingedly connected at their upper ends with the frame 9. The frame 9 and its immediate attachments, form an agitator, the operation of which will be hereinafter explained. The upper side edges of the frame 9 are chamfered as at 10, and the sides of the said frame 9 project some distance beyond the lower cross-piece 11 of the said frame. The corrugated plate 12 is mounted upon the frame 9, and is located in an inclined position, as indicated in Fig. 2 of the drawings. The corrugations of the said plate 12 are transversely disposed with relation to the frame 9. The rods 13 are secured at their upper ends to the cross-piece 11 of the frame 9, and the said rods are in parallel relation with each other, and are alternately arranged, relatively long and short, as illustrated in Fig. 1 of the drawings. The lip or chute 14 is attached at its upper end to the cross-piece 11 of the frame 9, and is located under the upper portions of the rods 13. The said lip or chute is downwardly inclined, but at a different angle from that of the inclination of the frame 9. The bearings 15 are mounted upon the cranks 4 of the shaft 3; and the spring arms 16 are connected at their upper ends to the lower sides of the said bearings 15, and the opposite ends of the said arms 16 are attached to the lower under portion of the frame 9 in the vicinity of the cross-bar 11 thereof.

The roller 17 is journaled for rotation at the lower end of the frame 2, and the shaft of the said roller is provided with a pulley 18. The belt 19 passes around the pulleys 6 and 18 and is adapted to transmit movement from the shaft 3 to the roller 17. A trunk 20 is located under the frame 9, and the roller 21 is journaled for rotation at the lower end of the trunk 20. The endless belt 22 passes around the rollers 21 and 17. The trunk 20 is provided with the cross-slats 23, which lie under the upper run of the endless belt 22 in the manner as illustrated in Fig. 2 of the drawings. The strips of flexible material 24 are attached to the sides of the trunk 20, and are adapted to lie over the edges of the endless belt 22, and are adapted to prevent material from falling from the edges of the said belt.

The operation of the pea-separator is as follows:—The shaft 3 is rotated by means of the belt which passes around the pulley 5, and which is not shown in the drawings, and through the cranks 4 in the shaft 3 and the spring arms 16, the frame 9 is moved vertically and longitudinally at its lower end, while the upper end of the said frame 9 describes arcs back and forth upon the lower ends of the standards 8 as centers and also rocks vertically upon the upper ends of the said standards 8. Thus a peculiar movement is transmitted to the frame 9, or the agitator, as it will be hereinafter referred to. It will be observed that the upper end of the agitator moves in defined and regular courses, while, by reason of the fact that the lower end of the said agitator is supported upon the spring arms 16, the vertical movement of the said agitator, at its lower end, is not confined to any defined courses. That is to say, the lower end of the said agitator possesses an irregular whipping or jumping movement, which will cause the material deposited upon the agitator to rebound or hop, the object of which is to facilitate the separation of the grain from the vines. It being understood that the vines and grain mixed are first passed upon the upper surface of the said agitator. At the same time rotary movement is transmitted to the roller 17, through the pulleys 6 and 18 and the belt 19, and the endless belt 22 moves in an orbit around the rollers 17 and 21, the upper run of the said belt 22 moving from the roller 21 toward the roller 17.

While the parts are in operation, as above described, the mixed material is fed upon the agitator in the frame 2, and, as the material passes down over the corrugations in the plate 12, the said material is subjected to the movement of the agitator, as above described. As the material passes down along the parallel rods 13, the peas and small trash will fall through the spaces between the said rods, while the matted vines will pass along the same. The material that passes through the spaces between the rods is conducted by the chute or lip 14 to the upper end portion of the upper run of the belt 22 and is deposited upon the same. The matted vines fall upon the upper end of the upper run of the belt 22, and are cast off from the same as the said material passes around the upper roller 17.

In view of the fact that the upper run of the belt 22 is moving from the roller 21 towards the roller 17, the round peas may roll down the upper run of the said belt, while the leaves and other smaller material are carried up by the belt, and are cast from the same, together with the matted vines, as above described. Thus the round peas are permitted to descend or roll down along the upper run of the belt 22, and are delivered from the machine at one side, while the refuse material is delivered from the machine at the opposite side.

Having described my invention, what I claim as new, and desire to secure, by Letters Patent, is:—

1. In a machine as described a frame, an agitator located therein, standards pivotally connected with the frame and the agitator, a shaft journaled in the frame and having cranks, bearings mounted upon the cranks, and spring arms connected with the bearings, and the end of the frame opposite that to which the standards are attached.

2. A machine as described comprising a frame, an inclined agitator located therein, standards hingedly connected at their lower ends with the frame, and at their upper ends with the agitator, a shaft journaled for rotation in the frame, said shaft being provided with cranks, bearings journaled upon said cranks, and spring arms connected at their upper ends with the said bearings and at their lower ends with the lower end of the said agitator.

In testimony that I claim the foregoing as my own, I have hereto affixed my signature in the presence of two witnesses.

ANTON L. HAMACEK.

Witnesses:
C. F. COHERNEY,
WM. KARSTEN.